Figure 1:
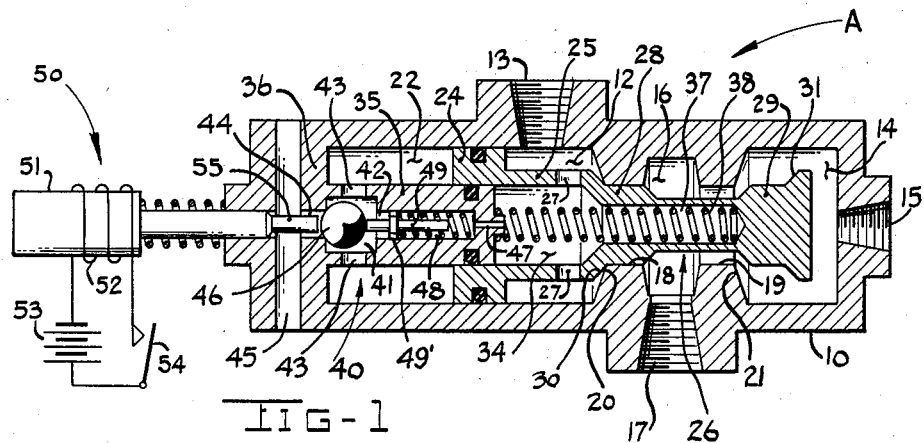

Nov. 17, 1959  D. GRANT ET AL  2,913,005
PILOT-ACTUATED CONTROL VALVE
Filed July 23, 1956

INVENTORS,
DAVID GRANT
JOSEPH T. STRONG
BY Leslie K. Loeler
THEIR AGENT.

United States Patent Office 2,913,005
Patented Nov. 17, 1959

2,913,005

PILOT-ACTUATED CONTROL VALVE

David Grant, Los Angeles, and Joseph T. Strong, Encino, Calif., assignors to Hughes Tool Company, Aircraft Division, Houston, Tex., a corporation of Delaware Application July 23, 1956, Serial No. 599,546

9 Claims. (Cl. 137—620)

This invention relates generally to valves for controlling the flow of fluid pressures, and more particularly to a control valve characterized by the fact that the fluid pressure being controlled responds to small movements of a selectively operable pilot valve for effecting the large and forceful movements essential to control valve actuation.

The present invention contemplates a two-position valve for directing fluid pressure from a source thereof to pressure operated equipment when the valve is in one position, and for exhausting fluid pressure from the equipment when the valve is in the other position. To accomplish these functions, the valve body is provided with inlet, exhaust, and intermediate chambers interconnected by ports arranged such that a reciprocable composite valve element drivenly connected to a double-acting piston is effective for alternately connecting the intermediate chamber to the inlet or exhaust chambers. The piston having opposed faces with different effective areas, is slidably received by a cylinder having one closed end and one end associated with the inlet chamber such that the piston face having the lesser effective area is directly exposed to fluid pressure existing in the inlet chamber for providing a force urging the piston and composite valve element in one direction to effect closure of one of the ports. To overcome this force and effect movement of the piston and valve element in the other direction, fluid pressure from the inlet chamber is conducted to the closed end of the cylinder where it is applied to the piston face having the larger effective area by a selectively operable pilot valve adapted to open or close a passageway leading from the inlet chamber to the closed end of the cylinder, and to close or open an exhaust passageway for releasing fluid pressure admitted to the closed cylinder end. The invention further contemplates the construction of such a two-position valve in which both ports are momentarily closed, while the composite valve element moves from one position to the other, for preventing a direct connection between the inlet and exhaust chambers, and in which the change of the composite valve element from one position to another is not only effected by the fluid pressure which the valve is intended to control, but the speed of such change is governed by the rate fluid pressure is admitted to the closed end of the cylinder and the rate such pressure is exhausted therefrom.

Accordingly, it is an object of this invention to provide a two-way control valve for selectively connecting pressure operated equipment to either of two sources of fluid pressure.

It is another object to provide a two-way valve for selectively connecting pressure operated equipment to a source of pneumatic pressure or to atmospheric pressure.

It is also an object to provide such a valve in which pressure from the source of pneumatic pressure is effective for actuating the valve, and in which the actuating pressure is controlled by a pilot valve.

It is another object to provide such a valve which is capable of instant response to the closing or opening of an electric circuit.

It is another object to provide a two-way poppet valve characterized by a pair of piston-driven reciprocable valve elements for connecting pressure responsive equipment to a source of pneumatic pressure or to ambient atmosphere, and to provide such a valve in which a direct connection between the pneumatic pressure source and the ambient atmosphere is prevented during movement of the reciprocable valve elements.

It is an additional object to provide a poppet valve of this character with an actuating pilot valve which can be variously constructed to provide control valves having different time rates of response to meet widely varying operating conditions.

It is a further object to provide a valve for precisely controlling the operation of fluid-pressure-actuated equipment remotely situated from a control point, which is not only free of astatic tendencies, but is characterized by a main valve element and a pilot valve element that are unaffected by vibration and/or gravity forces to the extent that the valve is extremely useful for controlling the various pieces of fluid-pressure-responsive equipment employed in both military and commercial aircraft.

These and other objects and advantages will become more apparent from the following description considered in connection with the accompanying drawings. It is expressly understood, however, that the drawings are for the purpose of illustration and description only, and are not intended as a definition of the limits of the invention.

Figure 2:
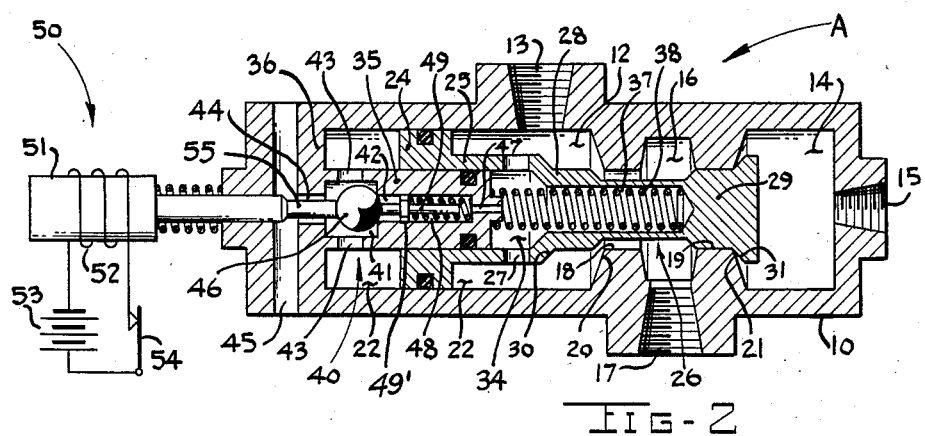

In the drawings:

Fig. 1 is a sectional view of a two-way valve embodying the features of this invention; and Fig. 2 is the same as the view in Fig. 1 except that the movable elements are shown in their opposite positions.

Referring to Figs. 1 and 2, the two-way valve generally identified by reference letter A includes a housing 10 having an inlet chamber 12 adapted for connection to a source of fluid pressure by a threaded opening 13, an exhaust chamber 14 provided with a threaded opening 15 leading to ambient atmosphere, and an intermediate chamber 16 adapted by a threaded opening 17 for connection to equipment of a character responsive to fluid pressure from the source. As shown, intermediate chamber 16 is not only positioned between inlet and exhaust chambers 12 and 14, but it is also fluid-conductively connected thereto by axially aligned bores comprising ports 18 and 19 respectively provided with concentric valve seats 20 and 21 on the inlet and exhaust chamber ends of the bores. Another portion of housing 10 is constructed to provide a piston-receiving cylinder bore 22 having one end closed, and arranged in axial alignment with ports 18 and 19 such that the other end of bore 22 forms, in effect, a continuation of inlet chamber 12.

Slidably disposed in cylinder bore 22 is a double-acting drive piston 24 with an axially extending portion 25 of reduced diameter drivingly connected to a double-acting valve element 26 having a piston-portion 28 adapted to slidably engage port 18, and another piston-portion 29 adapted to slidably engage port 19. Piston-portions 28 and 29 are respectively provided with conical flange-portions 30 and 31 which are conditioned to cooperate with valve seats 20 and 21 such as to alternately form fluid-tight engagements therewith. It is to be noted that the axial dimensions of piston-portions 28 and 29 substantially agree with the axial lengths of the bore comprising ports 18 and 19, and that the axial spacing of these piston portions with respect to the axial spacing of valve seats 18 and 19 is such as to afford concurrent engagements between the piston-portions and their respective ports during the transition of valve element 26 from the position wherein flange 30 sealingly engages valve seat 20

(Fig. 1) to its other position wherein flange 31 sealingly engages valve seat 21 (Fig. 2). This structural feature provides an important functional advantage, because it prevents a direct fluid-conducting connection between inlet chamber 12 and exhaust chamber 14.

Double-acting piston 24 and its axially extending portion 25 are provided with an axial coextensive bore 34 conditioned to slidably receive a cylindrical plunger-like projection 35 coextending within cylinder bore 22 from end wall 36 of housing 10. As illustrated, double-acting valve element 26 is provided with an axial bore 37 designed to accommodate a spring 38 which presses against the bottom of this bore and the inner end of projection 35 for urging valve element 26 and drive piston 24 to the position shown in Fig. 1 where piston-portion 29 is clear of port 19 and flange-portion 30 is in fluid-tight engagement with valve seat 20, thus to effect a normally open condition of port 19 and a normally closed condition of port 18.

Projection 35 serves as a housing for a pilot valve 40 comprising a valve chamber 41 having an inlet port 42, radial openings 43 communicating with the closed end of cylinder bore 22, an exhaust port 44 communicating with ambient atmosphere through an outlet passageway 45; and a spherical valve element such as ball 46 adapted for movement to alternately close the inlet and exhaust ports 42 and 44. It is to be seen in the drawing, that a fluid-conducting passageway leading from inlet port 42 to bore 34 of piston portion 25 is provided by an opening 47 in the inner end wall of projection 35 and a central bore 48 in said projection conditioned to support a spring-driven plunger 49, that communication between bore 34 and inlet chamber 12 is effected by radial openings 27 through the wall of axially extending portion 25 of piston 24, and that the spring-driven plunger serves the dual purpose of normally holding ball 46 in a position such as to effect an open condition of inlet port 42 and a closed condition of exhaust port 44. It is also to be noted that spring-driven plunger 49 includes a spring abutment portion 49' having a noncircular shape of conventional design such that fluid flows past the abutment portion on its way through central bore 48. Pilot valve 40 is provided with a selectively operable actuator including a solenoid 50 having a plunger 51 and a coil 52 embraced in an electric circuit with a battery 53 and a control switch 54. Plunger 51 is provided with an end portion 55 adapted to extend through exhaust port 44 so as to engage and move ball 46 from the position shown in Fig. 1 to the position shown in Fig. 2 wherein the condition normally produced by spring-driven plunger 49 is reversed; in other words, solenoid plunger 51 is adapted for effecting an open condition of exhaust port 44 and a closed condition of inlet port 42.

For purposes of describing the operation of valve A, let it be assumed that a source of compressed air and equipment responsive to compressed air are respectively connected to threaded openings 13 and 17, and that opening 15 communicates directly with ambient atmosphere: then, according to Fig. 1, compressed air in the pressure responsive equipment is allowed to escape to the ambient atmosphere through intermediate chamber 16, exhaust port 19, and exhaust chamber 14; and compressed air from the source flowing through inlet chamber 12, radial openings 27, bore 34, opening 47, central bore 48, and pilot valve 40 charges chamber 12, bore 34, and cylinder bore 22 on both sides of piston 24 simultaneously. In view of the charged condition of these cavities, three distinct forces are produced by compressed air applied to piston 24; the first being produced by pressure in chamber 12 acting on the right-hand side of the piston as a result of the continuity between the inlet chamber and cylinder bore 22; the second being produced by pressure in bore 34 acting against the inner end of plunger-like projection 35 and end walls of bores 34 and 37, which end walls comprise in effect an area on the left-hand side of piston 24 that equals the outside diameter of the projection; and the third being produced by pressure admitted to the closed end of cylinder bore 22 by pilot valve 40 acting on the left hand side of piston 24.

It is obvious from the drawing that the second and third forces operate conjointly with and in the same direction as the force of spring 38, while the first force acts in opposition to this combination of forces; hence the movement of valve element 26 such as to close port 19 and open port 18 must be effected by the first force. Since the unit pressures producing the three compressed-air forces are the same, the magnitudes of these forces are determined by piston areas exposed to compressed air, thus it follows; that, in the first force, the piston area involved is equal to the area of cylinder bore 22 minus the area of port 18; that, in the second force, the area involved equals the area of bore 34; and that, in the third force, the area involved equals the area of cylinder bore 22 less the area of bore 34.

Now, in order to achieve the movement required for valve element 26 to close port 19 and open port 18, the forces acting on piston 24 must be unbalanced in favor of the first force. This condition is accomplished by the ability of the pilot valve to completely remove the third force, and by the fact that the area of that face or portion of the double-acting piston exposed to compressed air in chamber 12 is greater than the area of bore 34 so as to provide the first force with a value exceeding the combined values of the second force and the force of spring 38. Thus, when switch 54 is operated to energize solenoid 50, and end portion 55 of plunger 51 causes the movement of ball 46 of pilot valve 40 from the position shown in Fig. 1 to the position shown in Fig. 2, compressed air escapes from the closed end of cylinder bore 22 to ambient atmosphere via radial openings 43, valve chamber 41, exhaust port 44, and outlet passageway 45; whereupon the first force overpowers the spring 38 and the second force such as to quickly move double-acting piston 24 and its mechanically connected double-acting valve element 26 from the position shown in Fig. 1 to the position shown in Fig. 2 where port 18 is open and flange 31 is in fluid-tight engagement with valve seat 21. Upon the return of control switch 54 to its open condition, solenoid 50 is deenergized and spring-driven plunger 49 returns ball 46 to its position closing exhaust port 44 and opening inlet port 42; in other words, pilot valve 40 is returned to its normal condition and compressed air again enters the closed end of cylinder bore 22 by way of inlet port 42, valve chamber 41, and radial opening 43 to reestablish the third force and effect the return stroke of piston 24 and valve element 26 from the position shown in Fig. 2 to the position shown in Fig. 1. Thus, the fluid-conducting passageway interconnecting inlet chamber 12 with the closed end of cylinder bore 22 is opened or closed with respect to the inlet chamber and is closed or opened to ambient atmosphere with respect to the closed end of the distal end of the cylinder bore by pilot valve 40.

Important features to be noted in connection with the reciprocating movement of double-acting valve element 26 and driving piston 24 are to be found in the structure providing for the removal and reestablishment of the third force. As seen in the drawings, end portion 55 of solenoid plunger 51 passes through exhaust port 44; hence, the time required for compressed air to escape from the closed end of cylinder bore 22 is a function of the difference between the area of the exhaust port and the cross sectional area of the end portion. Moreover, all compressed air admitted to the closed end of cylinder bore 22 must pass through opening 47 in the end of plunger-like projection 35; hence, the time required for charging the closed end of said cylinder bore is a function of the area of opening 47. Accordingly, the cross sectional areas of end portion 55 and opening 47 may be dimensioned to meet different operating requirements, which means that the time required for movement of double-acting piston and driven valve element 26 from one discrete position to the other after pilot valve operation is a built-in function affected by the dimensions selected. Furthermore, by dimensioning opening 47 and end portion 55 such as to provide liberal areas for the flow of compressed air, alternate movements of the drive piston and valve element can be rapidly effected to provide valve A with high-speed operating characteristics.

From the foregoing description, it should be apparent that valve A is not only adaptable for a wide range of operating conditions, but under all conditions the fluid pressure being controlled actually changes the valve from one position to the other in response to a selectively operable pilot valve, and though pilot valve 40 is shown as an electrically actuated valve, it is clearly obvious that other means may be employed to perform the function of moving ball 46 from exhaust port 44 to a position closing inlet port 42.

Attention is directed to the fact that, in valves constructed according to this invention as exemplified by valve A, the fluid-tight engagements between the valve seats and the conical flanges of the valve piston are effected by the fluid pressures being controlled; hence, an increase in the pressures involved provides an increase in the forces effecting the sealing engagements between the valve seats and the movable valve elements.

What is claimed as new is:

1. A combination comprising: a housing having a first chamber adapted for connection to a source of fluid pressure, a second chamber adapted for connection to fluid-pressure operated equipment, a first port fluid-conductively connecting the first and second chambers, a second port communicating with the second chamber for conducting fluid pressure from said second chamber, a cylinder associated with the first chamber such that one end of said cylinder constitutes one end of the first chamber, an end wall closingly associated with the other end of the cylinder, and a plunger-like cylindrical member extending inwardly of said cylinder from said end wall; first and second valves respectively associated with the first and second ports, said valves being interconnected for concurrent movement such that opening one of the ports effects closing of the other port; a valve actuating piston having opposed faces with different effective areas drivingly connected to the first and second valves for effecting the concurrent movement of said valves, said piston being reciprocably disposed in the housing cylinder such that the piston face with the lesser area faces the first chamber so that fluid pressure in said first chamber coacts directly with said piston face to produce a first force acting on the first and second valves in a direction to effect an open condition of the first valve port and a closed condition of the second valve port, and said piston being provided with a bore slidably receiving the plunger-like member and with a passageway through a wall of said bore fluid-conductively connecting said bore with the first chamber such that fluid pressure in said first chamber coacts with said bore and the plunger-like member to produce a second force acting on the first and second valves concurrently with and in a direction opposing the first force, said bore and plunger-like member being so proportioned relative to the lesser-area piston face that said first force effects open and closed conditions of the first and second ports, respectively, in opposition to action of said second force; and control means selectively conducting fluid pressure from the first chamber to the closed end of the housing cylinder for coaction with the piston face having the larger area for producing a third force acting on the first and second valves in a direction augmenting the second force such that the combined second and third forces act to move said valves and effect closed and open conditions of the first and second valve ports, respectively.

2. The combination defined in claim 1, in which the first and second ports of the housing and the first and second valves are constructed such that both ports are simultaneously and momentarily blocked with respect to pressure fluid flow during initial stages of port opening and closing movements of said valves.

3. The combination defined in claim 1 wherein the control means is characterized by a fluid-conducting passageway connecting the first chamber to the closed end of the housing cylinder; and by a selectively operable pilot valve adapted to open and close said passageway such that fluid pressure from the first chamber flows into the closed cylinder end and is applied against the larger-area piston face for producing the third force when the passageway is open, and such that the application of fluid pressure against said larger-area piston face is discontinued for stopping production of said third force when said passageway is closed.

4. The combination defined in claim 3, wherein the fluid-conducting passageway includes a portion extending lengthwise through the plunger-like member of the cylinder-closing end wall, said portion having a first terminal opening in the distal end of said plunger-like member communicating with the bore in the valve actuating piston, and a second terminal opening communicating with the closed end of the housing cylinder; and wherein the selectively operable pilot valve includes a movable element adapted for effecting closed and open conditions of said second terminal opening.

5. The combination defined in claim 4, which is further characterized by a spring adapted for biasing the first and second valves such that said valves normally effect closed and open conditions of the first and second ports, respectively; and by a spring adapted for biasing the movable element of the pilot valve such that said movable element normally effects an open condition of the second terminal opening of said passageway portion.

6. A combination comprising: a housing having a first chamber adapted for connection to a source of fluid pressure, a second chamber adapted for connection to equipment utilizing such pressure, a valve port interconnecting the first and second chambers, a cylinder associated with the first chamber such that one end of said cylinder constitutes one end of said first chamber, and end wall closingly associated with the other end of the cylinder, and a plunger-like member extending inwardly of said cylinder from said end wall; a main valve element associated with the valve port in said housing and adapted for movements to alternate positions for effecting open and closed conditions of said port; an actuating piston having opposed faces with different effective areas, mechanically connected to the main valve element for effecting the port opening and closing movements of said valve element, said piston being reciprocably disposed in the housing cylinder such that the piston face with the lesser area faces the first chamber so that fluid pressure in said first chamber coacts directly with said piston face to produce a first force acting on the main valve element in a direction to effect an open condition of the valve port, and said piston being provided with a bore slidably receiving the plunger-like member and with a passageway through a wall of said bore fluid-conductively connecting said bore with the first chamber so that fluid pressure in said first chamber coacts with said bore and the plunger-like member to produce a second force acting on the main valve element concurrently with and in a direction opposing said first force, said bore and plunger-like member being so proportioned relative to the lesser-area piston force that said first force effects the open condition of said valve port in opposition to the action of said second force; and valve control means selectively conducting fluid pressure from the first chamber to the closed end of the housing cylinder for coaction with the piston face having the larger area for producing a third force acting on the main valve element in a direction augmenting the second force such that the combined second and third forces act to move said valve element to the position effecting a closed condition of the valve port.

7. The combination defined in claim 6, wherein the valve control means is characterized by a fluid-conducting passageway connecting the first chamber to the closed end of the housing cylinder; and by a selectively operable pilot valve adapted to open and close said passageway such that fluid pressure from the first chamber flows into the closed cylinder end and is applied against the larger-area piston face for producing the third force when the passageway is open, and such that the application of fluid pressure against said larger-area piston face is discontinued for stopping production of said third force when said passageway is closed.

8. The combination defined in claim 7, wherein the fluid-conducting passageway includes a passageway portion extending lengthwise through the plunger-like member of the cylinder-closing end wall, said portion having a first terminal opening in the distal end of said plunger-like member communicating with the bore receiving said member in the actuating piston, and a second terminal opening communicating with the closed end of the housing cylinder; and wherein the selectively operable pilot valve includes a movable element adapted for movement to different positions effecting closed and open conditions of one of said terminal openings.

9. The combination defined in claim 8, which is further characterized by means normally biasing the main valve element to one of the alternate positions; and by means normally biasing the movable element of the pilot valve to one of the different positions such that fluid pressure in the first chamber is effective for producing a resultant force normally acting on the main valve element in the same direction as the first named biasing means.

References Cited in the file of this patent

UNITED STATES PATENTS

| | | |
|---|---|---|
| 1,986,206 | Kennedy | Jan. 1, 1935 |
| 2,617,444 | Gardner | Nov. 11, 1952 |
| 2,624,585 | Churchhill et al. | Jan. 6, 1953 |
| 2,709,446 | Miller | May 31, 1955 |